United States Patent
Fagan et al.

(10) Patent No.: US 12,514,606 B2
(45) Date of Patent: Jan. 6, 2026

(54) SURGICAL INSTRUMENTS HAVING A MOVABLE BLADE MEMBER FOR TREATING TISSUE

(71) Applicant: Covidien LP, Mansfield, MA (US)

(72) Inventors: James R. Fagan, Erie, CO (US); Thomas E. Drochner, Longmont, CO (US); Michael B. Lyons, Boulder, CO (US); David J. Van Tol, Boulder, CO (US); Matthew S. Cowley, Frederick, CO (US)

(73) Assignee: Covidien LP, Mansfield, MA (US)

( * ) Notice: Subject to any disclaimer, the term of this patent is extended or adjusted under 35 U.S.C. 154(b) by 569 days.

(21) Appl. No.: 17/799,747

(22) PCT Filed: Feb. 10, 2021

(86) PCT No.: PCT/US2021/017344
§ 371 (c)(1),
(2) Date: Aug. 15, 2022

(87) PCT Pub. No.: WO2021/178116
PCT Pub. Date: Sep. 10, 2021

(65) Prior Publication Data
US 2023/0070961 A1 Mar. 9, 2023

Related U.S. Application Data

(60) Provisional application No. 62/984,811, filed on Mar. 4, 2020.

(51) Int. Cl.
*A61B 17/295* (2006.01)
*A61B 17/00* (2006.01)
*A61B 17/29* (2006.01)

(52) U.S. Cl.
CPC ........ *A61B 17/295* (2013.01); *A61B 17/2909* (2013.01); *A61B 2017/00398* (2013.01);
(Continued)

(58) Field of Classification Search
CPC . A61B 17/32; A61B 17/320068; A61B 17/29; A61B 17/320094;
(Continued)

(56) References Cited

U.S. PATENT DOCUMENTS

| | | | |
|---|---|---|---|
| 5,569,284 | A | 10/1996 | Young et al. |
| 2001/0044635 | A1 | 11/2001 | Niizeki |

(Continued)

OTHER PUBLICATIONS

International Search Report and Written Opinion dated Jun. 28, 2021, issued in corresponding international appln. No. PCT/US2021/017344, 15 pages.

*Primary Examiner* — Darwin P Erezo
*Assistant Examiner* — Zehra Jaffri (57) ABSTRACT

A surgical instrument for treating tissue includes an articulating elongated shaft (14), a drive shaft (124) extending through the elongated shaft and configured to rotate about a longitudinal axis defined by the drive shaft, and an end effector assembly (100) coupled to a distal end portion of the elongated shaft. The end effector assembly includes a jaw member (110) and a blade member (112) configured to oscillate in response to a rotation of the drive shaft (124) to treat tissue disposed between the jaw member and the blade member.

13 Claims, 4 Drawing Sheets

(52) U.S. Cl.
CPC ............... *A61B 2017/00477* (2013.01); *A61B 2017/2903* (2013.01); *A61B 2017/2905* (2013.01); *A61B 2017/2908* (2013.01)

(58) Field of Classification Search
CPC ........... A61B 17/320092; A61B 2017/320093; A61B 17/295; A61B 17/2909; A61B 2017/2903; A61B 2017/2905; A61B 17/2908
See application file for complete search history.

(56) References Cited

U.S. PATENT DOCUMENTS

| | | |
|---|---|---|
| 2007/0162062 A1 | 7/2007 | Norton et al. |
| 2011/0015660 A1* | 1/2011 | Wiener ............... A61B 18/1445 606/169 |
| 2012/0046660 A1 | 2/2012 | Nau, Jr. |
| 2012/0259325 A1* | 10/2012 | Houser .................. A61B 17/29 606/41 |
| 2013/0331842 A1 | 12/2013 | Harp |
| 2015/0080924 A1* | 3/2015 | Stulen ............ A61B 17/320092 606/169 |
| 2015/0105690 A1* | 4/2015 | Hathaway .......... A61B 10/0283 600/566 |

* cited by examiner

SURGICAL INSTRUMENTS HAVING A MOVABLE BLADE MEMBER FOR TREATING TISSUE

FIELD

The present technology is generally related to surgical instruments and, more particularly, to tissue treating mechanisms for use with surgical end effector assemblies, instruments, and systems.

BACKGROUND

A surgical forceps is a pliers-like instrument that relies on mechanical action between jaw members of its end effector assembly to grasp, clamp, and constrict tissue. Some surgical forceps utilize both mechanical clamping action and energy to accurately sever the tissue. Accordingly, many surgical forceps incorporate a knife, an ultrasonic blade, or other suitable members utilized to effectively treat (e.g., cut and/or seal) the tissue clamped by the end effector assembly.

During laparoscopic or endoscopic surgical procedures, access to a surgical site is achieved through a small incision or through a narrow cannula inserted through a small entrance wound in a patient. Because of limited area available to access the surgical site, many surgical forceps include mechanisms for articulating the end effector assembly thereof in relation to a body portion of the forceps to improve access to tissue to be treated.

SUMMARY

The techniques of this disclosure generally relate to surgical instruments for sealing and/or cutting tissue. In accordance with aspects of the disclosure, the surgical instrument includes an elongated shaft, a drive shaft extending through the elongated shaft, and an end effector assembly coupled to a distal end portion of the elongated shaft. The elongated shaft has a distal end portion configured to articulate relative to a proximal end portion of the elongated shaft. The drive shaft is configured to rotate about a longitudinal axis defined by the drive shaft. The drive shaft has a proximal end portion configured to be operably coupled to a drive motor. The end effector assembly includes a jaw member and a blade member opposing the jaw member. The jaw member is pivotable relative to the distal end portion of the elongated shaft. The blade member is configured to operably engage a distal end portion of the drive shaft, such that the blade member is configured to oscillate in response to a rotation of the drive shaft to treat tissue disposed between the jaw member and the blade member.

In aspects, the blade member may be configured to oscillate in a direction parallel with the longitudinal axis defined by the drive shaft.

In aspects, the drive shaft may have a cam member coupled to the distal end portion of the drive shaft. The blade member may have a cam follower coupled to a proximal end portion of the blade member and operably engaged with the cam member.

In aspects, the cam follower may have a protuberance, and the cam member may have a protuberance configured to selectively engage the protuberance of the cam follower during rotation of the drive shaft.

In aspects, the cam member may have a distally-facing surface from which the protuberance protrudes distally, and the cam follower may have a proximally-facing surface from which the protuberance protrudes proximally.

In aspects, the surgical instrument may further include a biasing member interconnecting the cam member and the cam follower. The biasing member may be configured to resiliently bias the cam follower in a proximal direction toward the cam member.

In aspects, the blade member may be configured to oscillate in a direction perpendicular to the longitudinal axis defined by the drive shaft.

In aspects, the drive shaft may have an elongated cam member supported on a distal end portion of the drive shaft. The elongated cam member may be engaged with the blade member and configured to rotate with the drive shaft and relative to the blade member.

In aspects, the end effector assembly may include an elongated housing extending distally from the distal end portion of the elongated shaft. The blade member may be supported by the housing and configured to oscillate relative to the housing during rotation of the cam member.

In aspects, the drive shaft may be flexible along a length thereof, such that the drive shaft flexes as the distal end portion of the elongated shaft articulates.

In aspects, the distal end portion of the elongated shaft may be configured to articulate from a first position and a second position. In the first position, the end effector assembly may be coaxial with a longitudinal axis defined by the elongated shaft. In the second position, the end effector assembly may be offset from the longitudinal axis defined by elongated shaft.

In accordance with another aspect of the disclosure, a hand-held surgical instrument is provided and includes a handle assembly, an elongated shaft, a drive shaft extending longitudinally along the elongated shaft, and a blade member. The handle assembly includes a handle housing and an articulation switch movably coupled to the handle housing. The elongated shaft has a proximal end portion coupled to the handle housing, and a distal end portion configured to articulate relative to the proximal end portion in response to an actuation of the articulation switch. The drive shaft is configured to rotate about a longitudinal axis defined by the drive shaft and has a proximal end portion operably coupled to a drive motor. The blade member is operably engaged to a distal end portion of the drive shaft, such that the blade member is configured to oscillate in response to a rotation of the drive shaft to treat tissue that contacts the blade member.

In aspects, the cam follower may have a ramped surface, and the cam member may have a nub protruding therefrom and configured to selectively engage the ramped surface during rotation of the drive shaft.

In aspects, the cam member may have a distally-facing surface from which the nub protrudes distally, and the cam follower may have a proximally-facing surface from which the ramped surface protrudes proximally.

In aspects, the hand-held surgical instrument may further include a biasing member interconnecting the cam member and the cam follower. The biasing member may be configured resiliently bias the cam follower in a proximal direction toward the cam member.

In aspects, the hand-held surgical instrument may further include an elongated housing extending distally from the distal end portion of the elongated shaft. The blade member may be flexible and supported by the housing, such that the blade member oscillates relative to the housing during rotation of the cam member.

As used herein, the term "distal" refers to the portion that is being described which is further from a user, while the term "proximal" refers to the portion that is being described which is closer to a user. Further, to the extent consistent, any or all of the aspects detailed herein may be used in conjunction with any or all of the other aspects detailed herein.

BRIEF DESCRIPTION OF THE DRAWINGS

The above and other aspects and features of the present disclosure will become more apparent in view of the following detailed description when taken in conjunction with the accompanying drawings wherein like reference numerals identify similar or identical elements and.

DETAILED DESCRIPTION

The disclosure is generally directed to a minimally invasive surgical instrument for grasping and treating tissue using a blade member. Some surgical instruments have a blade member in communication with an ultrasonic transducer for vibrating the blade member at ultrasonic frequencies suitable for treating tissue contacted by the blade member. To transfer ultrasonic energy to the blade member, a rigid waveguide typically interconnects the ultrasonic transducer and the blade member. Due to the rigid nature of most waveguides, it is difficult to incorporate an articulating function into ultrasonic surgical instruments. The surgical instrument of the disclosure cures these and other drawbacks of ultrasonic surgical instruments.

The surgical instrument of the disclosure may be hand-held or have components configured to be operated by a robotic system. The surgical instrument includes an elongated shaft having an end effector assembly coupled to a distal end portion thereof. The elongated shaft has a flexible or bendable articulating section that allows the distal end portion and the attached end effector assembly to articulate in a plurality of directions. The end effector assembly has a pivotable jaw member and a blade member in opposing relation with the jaw member. With tissue grasped between the jaw member and the blade member, the blade member is rapidly oscillated. Oscillation of the blade member is driven by a rotatable drive shaft extending through the elongated shaft. The drive shaft has a pivotable, bendable, or otherwise flexible portion that articulates with an articulation of the elongated shaft while also allowing for the transfer of rotational forces through the elongated shaft and to the blade member.

Figure 1A:
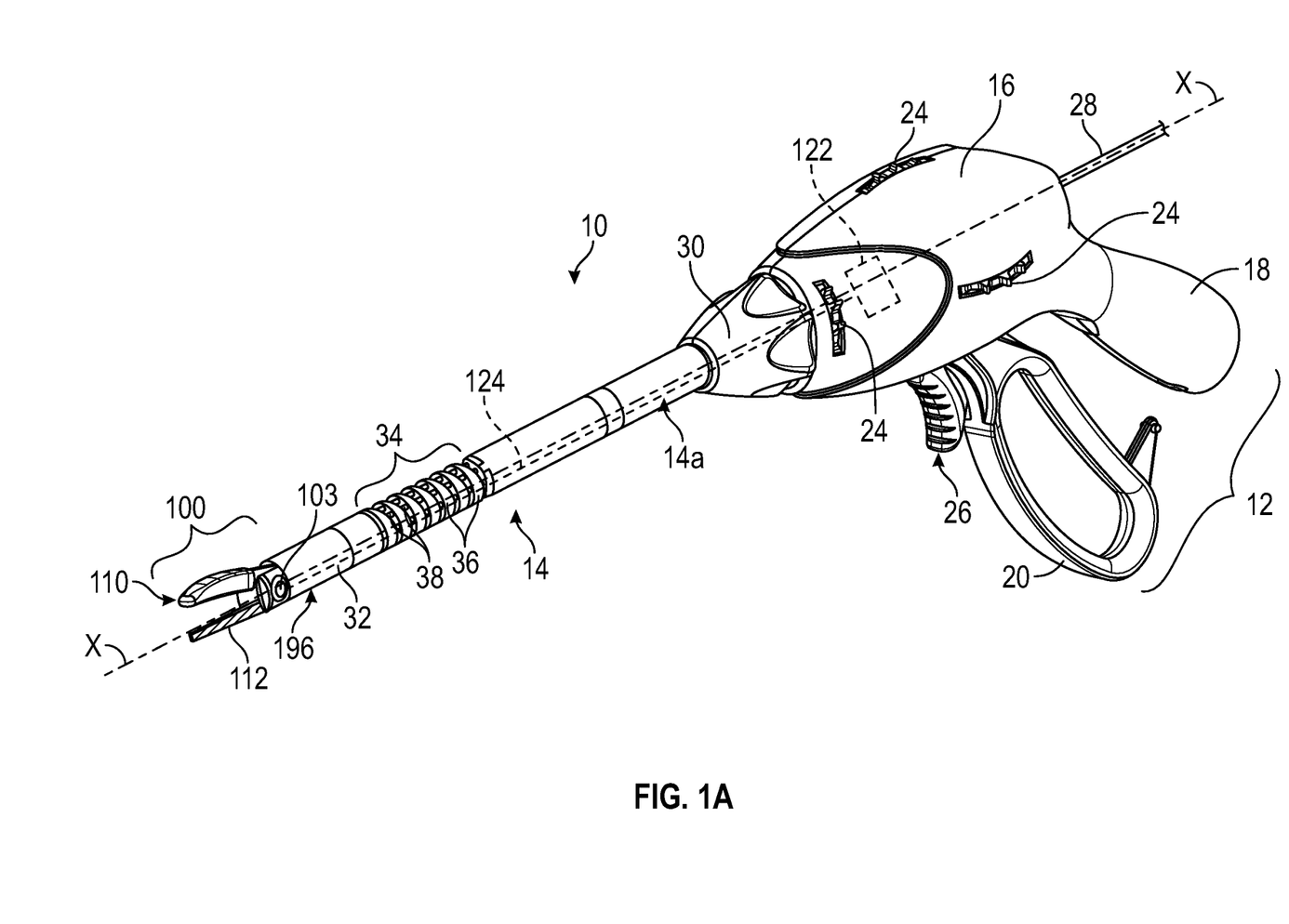
FIG. 1A is a perspective view illustrating a hand-held surgical instrument including a jaw member in an opened position relative to an oscillating blade member.
Figure 1B:
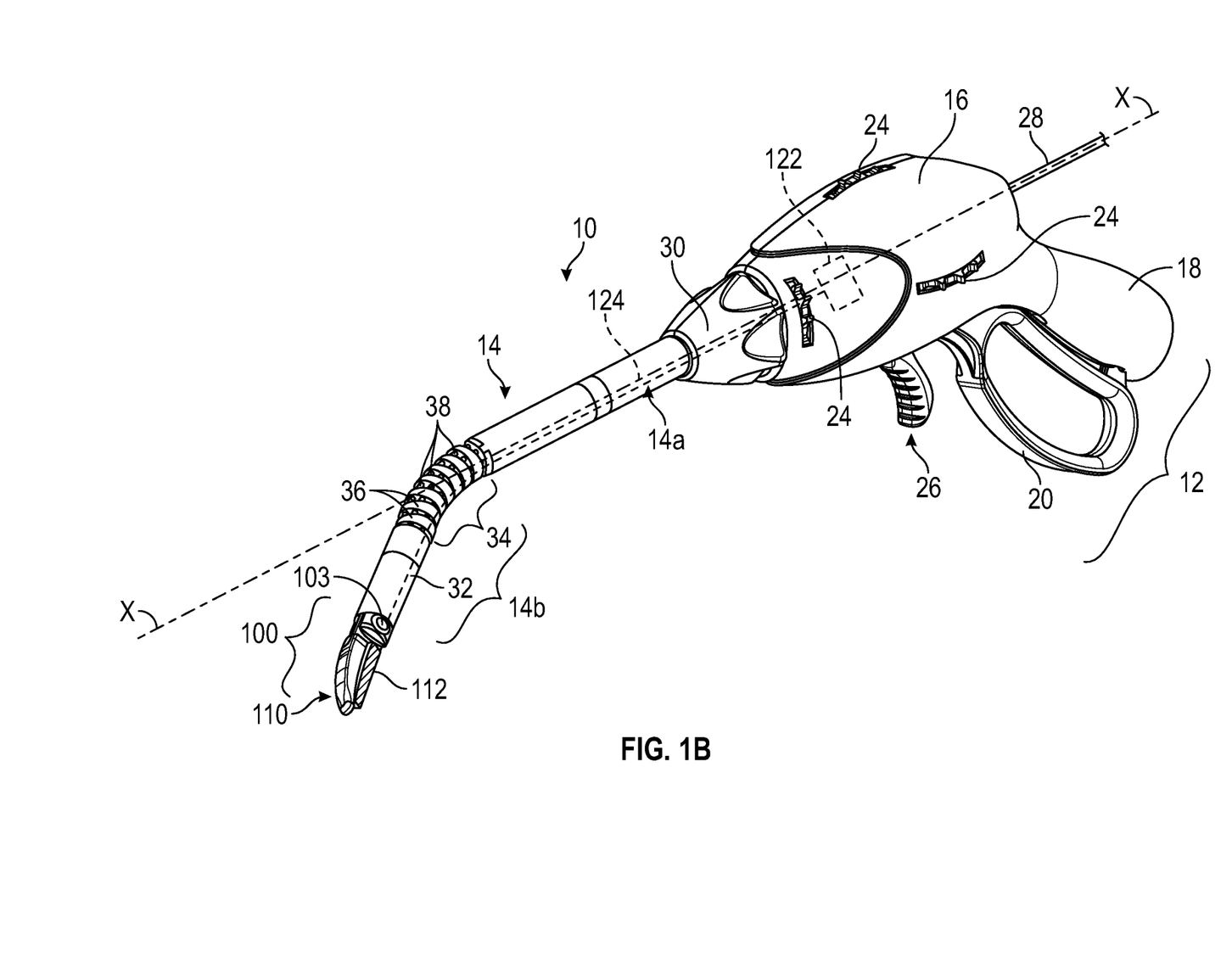
FIG. 1B is a perspective view illustrating the surgical instrument of FIG. 1A in an articulated position and with the jaw member in a closed position relative to the blade member.

Referring generally to FIGS. 1A and 1B, an endoscopic, hand-held surgical instrument 10 includes a handle assembly 12, an endoscopic portion, such as, for example, an elongated shaft 14 extending distally from the handle assembly 12, and an end effector assembly 100 coupled to a distal end portion 14b of the elongated shaft 14. The handle assembly 12 includes a handle housing 16 having a fixed handle 18 integrally associated therewith, and a movable handle 20 movable relative to the fixed handle 18. The movable handle 20 is operably coupled to a drive assembly (not shown) configured to impart movement of a jaw member 110 of the end effector assembly 100 about a pivot 103 relative to a blade member 112 of the end effector assembly 100.

The jaw member 110 is configured to move between a spaced-apart position (FIG. 1A) relative to the blade member 120 and an approximated position (FIG. 1B) relative to the blade member 120 to grasp tissue between the jaw member 110 and the blade member 120. As shown in FIG. 1A, the movable handle 20 is disposed in a spaced-apart position relative to the fixed handle 18 and, correspondingly, the end effector assembly 100 is disposed in the spaced-apart position. The movable handle 20 is depressible from the spaced-apart position to a depressed position corresponding to the approximated position of the end effector assembly 100 (FIG. 1B). In aspects, the surgical instrument may be devoid of the jaw member 110.

The handle assembly 12 further includes a plurality of articulation actuators 24 and a trigger 26 each movably coupled to the handle housing 16. The articulation actuators 24 are configured to effectuate an articulation of the end effector assembly 100 between a non-articulated position (FIG. 1A), in which the end effector assembly 100 is coaxial or otherwise parallel with a longitudinal axis "X" defined by the elongated shaft 14, and at least one articulated position (FIG. 1B), in which the end effector assembly 100 is offset from the longitudinal axis "X" defined by the elongated shaft 14. The trigger 26 is pivotable relative to the handle housing 16 and is configured to actuate a drive motor 122 to drive an oscillation of the blade member 112 of the end effector assembly 100. As an alternative to a pivoting trigger 26, a slide trigger, push-button, toggle switch, or other suitable actuator may be provided. The surgical instrument 100 may be powered via an internal power source (e.g., an internal battery, not explicitly shown) or, alternately, by an external power source via a cable 28.

The proximal end portion 14a of the elongated shaft 14 is non-rotationally coupled to a rotatable knob housing 30, which is rotatably coupled to the handle housing 16, such that the elongated shaft 14 and the attached end effector assembly 100 are configured to rotate about a longitudinal axis "X" defined by the elongated shaft 14. The proximal end portion 14a of the elongated shaft 14 may be rigid along its length to maintain a linear configuration during use. The distal end portion 14b of the shaft 14 has a rigid distal section 32 connected to the end effector assembly 100 and an articulating section 34 disposed between the rigid distal section 32 and the proximal end portion 14a. The articulating section 34 includes a plurality of articulating links 36 having a plurality of articulation cables 38 extending therethrough. Each cable 38 is operably engaged at its distal end to the rigid distal section 32 and at its proximal end to one of the articulation actuators 24 to enable articulation of the rigid distal section 32 and, thus, the end effector assembly 100, relative to the proximal end portion 14a upon actuation of one or more of the articulation actuators 24. In some aspects, the articulating section 34 and the articulation actuators 24 may be omitted, such that the elongated shaft 14 does not articulate.

Figure 2:
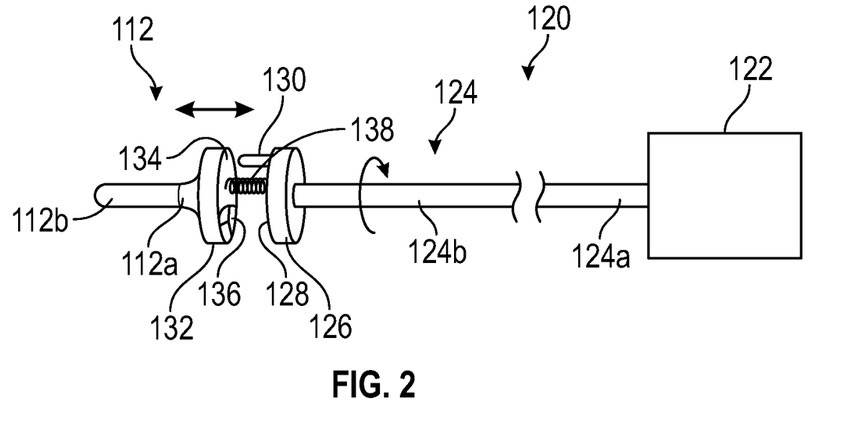
FIG. 2 is a side perspective view illustrating a drive assembly of the surgical instrument of FIGS. 1A and 1B for driving an oscillation of the blade member.

With reference to FIG. 2, the surgical instrument 10 includes a drive assembly 120 for driving an oscillation of the blade member 112 of the end effector assembly 100. The term oscillation used herein describes a rapid back and forth movement of the blade member 112 along a linear path at a rate sufficient to seal and/or cut through tissue that contacts the oscillating blade member 112.

The drive assembly 120 includes a drive motor 122 received in the handle housing 16 (FIG. 1A) and a drive shaft 124 extending through the elongated shaft 14 (FIG. 1A). The drive motor 122 may be an electric motor operably coupled to a proximal end portion 124a of the drive shaft 124. The drive motor 122 drives a rotation of the drive shaft 124 about a longitudinal axis of the drive shaft 124. In aspects, the drive motor 122 may be disposed outside of the handle housing 16 and/or incorporated into a robotic arm.

The proximal end portion 124a of the drive shaft 124 may be directly, operably coupled to the drive motor 122 or indirectly, operably coupled to the drive motor 122 via a series of gears, belts, screws, linkages, or the like. The drive shaft 124 may be fabricated from a flexible material, such as, for example, rubber, plastics, metals, etc., to allow the drive shaft 124 to flex or otherwise bend during articulation of the articulating section 34 (FIG. 1B) of the elongated shaft 14 while also maintaining the ability to transfer rotational forces from the drive motor 122 to a cam member 126 disposed at a distal end portion 124b of the drive shaft 124. In aspects, the drive shaft 124 may be a tube, a non-cannulated shaft, include a bundle of metal wires, and/or include a universal joint.

The cam member 126 is fixed to the distal end portion 124b of the drive shaft 124 and may have a disc-shape. In aspects, the cam member 126 may assume other suitable shapes, such as, for example, elongated, squared, cone-shaped, or the like. The cam member 126 has a distally-facing surface 128 and a protuberance, such as, for example, a nub 130 extending distally from the distally-facing surface 128. The nub 130 is disposed radially outward from a center point of the cam member 126 (e.g., offset from a longitudinal axis of the drive shaft 124). In aspects, the protuberance 130 may include a ramped surface, undulations, an arcuate surface, helical interdigitations, a pin, a block, etc.

The blade member 112 has a proximal end portion 112a supported in the distal end portion 14b of the elongated shaft 14 while being permitted to move axially in a direction parallel to the longitudinal axis "X" of the elongated shaft 14. The blade member 112 has a cam follower 132 fixed to the proximal end portion 112a thereof. The cam follower 132 has a disc-shaped configuration, but it is contemplated that the cam follower 132 may assume other suitable shapes, such as, for example, elongated, squared, cone-shaped, or the like. The cam follower 132 has a proximally-facing surface 134 and a protuberance, such as, for example, a ramped surface 136 extending proximally from the proximally-facing surface 134. It is contemplated that the protuberance 136 may include various alternate configurations similar to those listed for protuberance 130. In aspects, the surface 128 may include a recess (not shown) whereas the surface 134 includes a protuberance or vice versa. The ramped surface 136 is disposed radially outward from a center point of the cam follower 132 (e.g., offset from a longitudinal axis of the drive shaft 124). The cam member 126 is operably engaged to the cam follower 132 via the interaction between the nub 130 of the cam member 126 and the ramped surface 136 of the cam follower 132. A biasing member 138, such as, for example, a coil spring interconnects the cam follower 132 to the cam member 126 and resiliently biases the cam follower 132 proximally toward the cam member 126. In aspects, the biasing member 138 may be any suitable spring, such as a torsion spring, a flat spring, or the like. In aspects, instead of using the biasing member 138, the cam follower 132 and the cam member 126 may be coupled via an annular track received in an annular race.

The distal end portion 112b of the blade member 112 extends distally from the cam follower 132 and opposes the jaw member 110. The blade member 112 may have a cylindrical configuration and may be fabricated from a metal having a coarse outer surface to increase the frictional engagement between the blade member 112 and tissue. In aspects, the blade member 112 may assume any suitable shape, such as, for example, a rectangle, a triangle, a sphere, or the like, and may be fabricated from any suitable material, such as, for example, plastics, metals, etc. The blade member 112 may have a smooth outer surface or surface projections, such as, for example, a plurality of spikes extending from the outer surface thereof. In aspects, the blade member 112 may include knurls, splines, or any other suitable surface features.

In operation, tissue is positioned between the jaw member 110 and the blade member 112 with the end effector assembly 100 in the spaced-apart position, as shown in FIG. 1A. To treat the tissue during a surgical procedure, the movable handle 20 is actuated toward the depressed position (FIG. 1B), whereby the jaw member 110 is pivoted toward the blade member 112 to close the end effector assembly 100 about the tissue. With the end effector assembly 100 in the closed position, as shown in FIG. 1B, the trigger 26 may be actuated to activate the drive motor 122 of the drive assembly 120. The drive motor 122 drives a rotation of the drive shaft 124, thereby rotating the cam member 126 therewith and relative to the blade member 112.

As the cam member 126 rotates relative to the cam follower 132, the nub 130 of the cam member 126 slides over the ramped surface 136 of the cam follower 132 during each revolution to push or otherwise translate the blade member 112 distally against the resilient bias of the biasing member 138. After the nub 130 passes over the ramped surface 136, the biasing member 138 pulls or otherwise translates the blade member 112 proximally to reset the cam follower 132. As such, during each revolution of the cam member 126, the blade member 112 is caused to translate distally a distance equivalent to a thickness of the ramped surface 136 and then proximally the same distance.

The blade member 112 is caused to oscillate at a rate sufficient to cut through or seal the tissue due to the high friction between the blade member 112 and the tissue. For example, the blade member 112 may have a frequency of from about 0.5 kHz to about 100 kHz, and in some aspects, from about 7 kHz to about 40 kHz. In some aspects, the surgical instrument 10 may seal tissue without having to clamp the tissue between the jaw member 110 and the blade member 112. In aspects, to increase the frequency of oscillations during each revolution of the cam member 126, the cam member 126 may have a plurality of circumferentially-spaced nubs 130, and the cam follower 132 may have a corresponding number of circumferentially-spaced ramped surfaces 136. In aspects, RF energy may be applied to assist in sealing the tissue.

Figure 3:
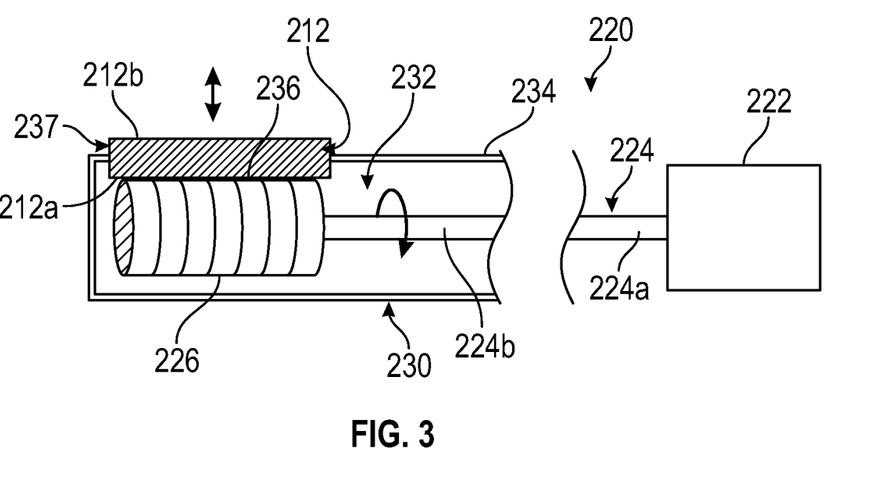
FIG. 3 is a side perspective view illustrating another aspect of a drive assembly of the surgical instrument of FIGS. 1A and 1B for driving an oscillation of another embodiment of a blade member.

FIG. 3 illustrates another drive assembly 220 and blade member 212 suitable for use in the surgical instrument 10 of FIGS. 1A and 1B. The drive assembly 220 includes an electric drive motor 222 and an elongated drive shaft 224 having a proximal end portion 224a operably coupled to the drive motor 222. The drive shaft 224 has an elongated cam member 226 supported on a distal end portion 224b of the drive shaft 224 and engaged with the blade member 212. The elongated cam member 226 is configured to rotate with the drive shaft 224 and relative to the blade member 212 in response to an activation of the drive motor 222. The elongated cam member 226 has a cam-shaped transverse cross-sectional profile along its length, such as, for example, pear-shaped, heart-shaped, oval, drop-shaped, or the like. In aspects, the elongated cam member 226 may have one or more cam surfaces projecting radially outward therefrom.

An elongated jaw housing 230 may be provided that extends distally from the distal end portion 14b of the elongated shaft 14 and opposes the jaw member 110 (FIG. 1A). The distal end portion 224b of the drive shaft 224 and the elongated cam member 226 extend through a cavity 232 defined by the jaw housing 230. The jaw housing 230 may be pivotably coupled to the distal end portion 14b of the elongated shaft 14 or disposed in fixed relation to the elongated shaft 14. The elongated jaw housing 230 has a tissue-facing surface 234 defining an elongated slot 237 in which the blade member 212 is supported.

The blade member 212 may be made of a flexible material, such as, for example, various plastics, rubber, sheet metal, etc. In aspects, the blade member 212 may be made of a rigid material. The blade member 212 has a bottom surface 212a extending into the cavity 232 of the jaw housing 230, and a top surface 212b extending from the tissue-facing surface 234 of the jaw housing 230. The entire or at least a majority of the bottom surface 212a of the blade member 212 is engaged with the elongated cam member 226. The blade member 212 is configured to oscillate within the slot 237 in a direction perpendicular to a longitudinal axis defined by the drive shaft 212 and relative to the jaw housing 230 during rotation of the elongated cam member 226. Alternately or additionally, the blade member 212 may be configured to oscillate in a direction parallel to the longitudinal axis defined by the drive shaft 212. In aspects, the blade member 212 may have thickness that tapers in a proximal direction, such that a distal tip of the blade member 212 is closer to the jaw member 110 than is a proximal end of the blade member 212. In aspects, the blade member 212 may be rigid along its length and be slidably supported within the cavity 232 of the jaw housing 230 via, for example, a pin in slot connection, to allow for oscillation therein.

In operation, to treat the tissue during a selected surgical procedure, the trigger 26 may be actuated to activate the drive motor 222 of the drive assembly 220 to rotate the drive shaft 224, thereby rotating the elongated cam member 226 therewith and relative to the blade member 212. Due to the cam profile of the elongated cam member 226, as the elongated cam member 226 rotates relative to the blade member 212, the elongated cam member 226 pushes or otherwise flexes the blade member 212 upwardly relative to the tissue-facing surface 234 of the jaw housing 230. After the elongated cam member 226 rotates 180 degrees, a cam surface 236 of the elongated cam member 226 disengages the blade member 212, whereby the blade member 212 is free to flex downwardly back to its resting position due to the resilient nature of the blade member 212. As such, during each revolution of the elongated cam member 226, the blade member 212 is caused to move upwardly and then downwardly two times. In aspects, the blade member 212 may follow the cam member 226. In aspects where the elongated cam member 226 has a plurality of cam surfaces circumferentially spaced from one another about the elongated cam member 226, the blade member 212 is caused to oscillate a commensurate amount during each revolution of the elongated cam member 226.

The blade member 212 is caused to oscillate at a rate sufficient to cut through or seal the tissue due to the high friction between the blade member 212 and the tissue. For example, the blade member 212 may have a frequency of from about 0.5 kHz to about 100 kHz, and in some aspects, from about 7 kHz to about 40 kHz. In some aspects, the surgical instrument 10 may treat tissue without having to clamp the tissue between the jaw member 110 and the blade member 212.

Figure 4:
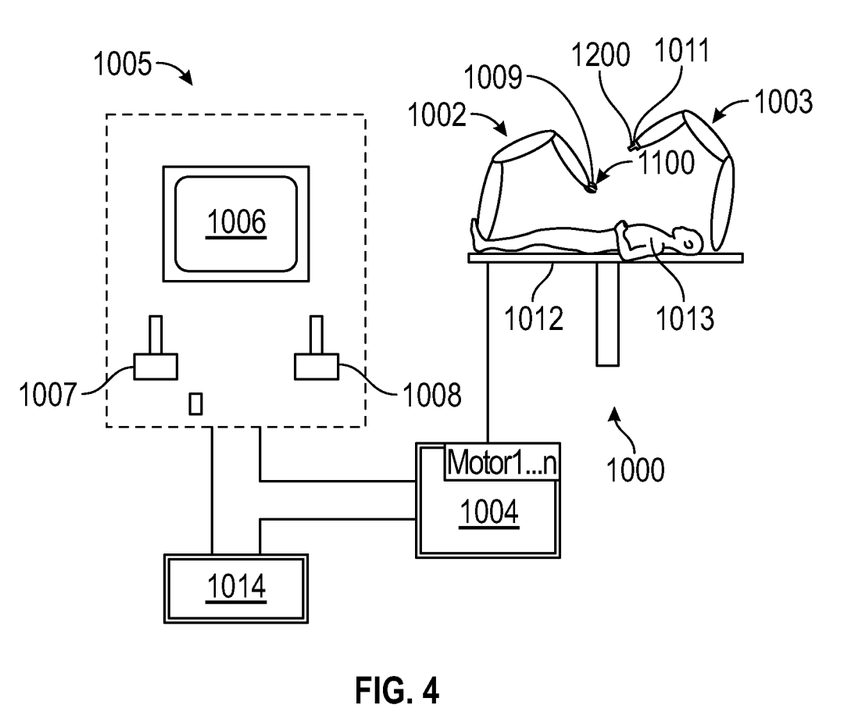
FIG. 4 is a schematic illustration of a robotic surgical system incorporating any of the disclosed drive assemblies/blade members.

Referring generally to FIG. 4, a robotic surgical system exemplifying the aspects and features of the present disclosure is shown generally identified by reference numeral 1000. For the purposes herein, robotic surgical system 1000 is generally described. Aspects and features of robotic surgical system 1000 not germane to the understanding of the present disclosure are omitted to avoid obscuring the aspects and features of the present disclosure in unnecessary detail.

Robotic surgical system 1000 includes a plurality of robot arms 1002, 1003; a control device 1004; and an operating console 1005 coupled with control device 1004. Operating console 1005 may include a display device 1006, which may be set up in particular to display three-dimensional images; and manual input devices 1007, 1008, by means of which a surgeon may be able to telemanipulate robot arms 1002, 1003 in a first operating mode. Robotic surgical system 1000 may be configured for use on a patient 1013 lying on a patient table 1012 to be treated in a minimally invasive manner. Robotic surgical system 1000 may further include a database 1014, in particular coupled to control device 1004, in which are stored, for example, pre-operative data from patient 1013 and/or anatomical atlases.

Each of the robot arms 1002, 1003 may include a plurality of members, which are connected through joints, and an attaching device 1009, 1011, to which may be attached, for example, an end effector assembly 1100, 1200, respectively. End effector assembly 1100 is similar to the end effector assembly 100 (FIGS. 1A and 1B), although other suitable end effector assemblies for coupling to attaching device 1009 are also contemplated. End effector assembly 1200 may be any end effector assembly, e.g., an endoscopic camera, other surgical tool, etc. Robot arms 1002, 1003 and end effector assemblies 1100, 1200 may be driven by electric drives, e.g., motors, that are connected to control device 1004. Control device 1004 (e.g., a computer) may be configured to activate the motors, in particular by means of a computer program, in such a way that robot arms 1002, 1003, their attaching devices 1009, 1011, and end effector assemblies 1100, 1200 execute a desired movement and/or function according to a corresponding input from manual input devices 1007, 1008, respectively. Control device 1004 may also be configured in such a way that it regulates the movement of robot arms 1002, 1003 and/or of the motors.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

What is claimed is:

1. A surgical instrument for treating tissue, comprising:
   an elongated shaft having a proximal end portion, and a distal end portion configured to articulate relative to the proximal end portion;
   a drive shaft extending through the elongated shaft and configured to rotate about a longitudinal axis defined by the drive shaft, the drive shaft having a proximal end portion configured to be operably coupled to a drive motor and a cam member coupled to a distal end portion of the drive shaft; and
   an end effector assembly coupled to the distal end portion of the elongated shaft and including:
      a jaw member pivotable relative to the distal end portion of the elongated shaft; and
      a blade member opposing the jaw member, wherein the blade member comprises a cam follower coupled to a proximal end portion of the blade member and operably engaged with the cam member such that the blade member is configured to oscillate in a direction parallel with the longitudinal axis in response to a rotation of the drive shaft to treat tissue disposed between the jaw member and the blade member.

2. The surgical instrument according to claim 1, wherein the cam follower has a first protuberance, and the cam member has a second protuberance configured to selectively engage the first protuberance of the cam follower during rotation of the drive shaft.

3. The surgical instrument according to claim 2, wherein the cam member has a distally-facing surface from which the second protuberance protrudes distally, and the cam follower has a proximally-facing surface from which the first protuberance protrudes proximally.

4. The surgical instrument according to claim 1, further comprising a biasing member interconnecting the cam member and the cam follower and configured to resiliently bias the cam follower in a proximal direction toward the cam member.

5. The surgical instrument according to claim 1, wherein the drive shaft is flexible along a length thereof, such that the drive shaft flexes as the distal end portion of the elongated shaft articulates.

6. The surgical instrument according to claim 5, wherein the distal end portion of the elongated shaft is configured to articulate from a first position, in which the end effector assembly is coaxial with a longitudinal axis defined by the elongated shaft, and at least one second position, in which the end effector assembly is offset from the longitudinal axis defined by the elongated shaft.

7. A hand-held surgical instrument, comprising:
   a handle assembly including:
      a handle housing; and
      an articulation switch movably coupled to the handle housing;
   an elongated shaft having a proximal end portion coupled to the handle housing, and a distal end portion configured to articulate relative to the proximal end portion in response to an actuation of the articulation switch;
   a drive shaft extending longitudinally along the elongated shaft and configured to rotate about a longitudinal axis defined by the drive shaft, the drive shaft having a proximal end portion operably coupled to a drive motor; and
   a blade member operably engaged to a distal end portion of the drive shaft, such that the blade member is configured to oscillate in a direction perpendicular to the longitudinal axis in response to a rotation of the drive shaft to treat tissue that contacts the blade member,
   wherein the drive shaft has an elongated cam member supported on a distal end portion of the drive shaft and engaged with the blade member, the elongated cam member configured to rotate with the drive shaft and relative to the blade member.

8. The surgical instrument according to claim 1, wherein the cam follower has a ramped surface, and the cam member has a nub protruding therefrom and configured to selectively engage the ramped surface during rotation of the drive shaft.

9. The hand-held surgical instrument according to claim 7, further comprising an elongated housing extending distally from the distal end portion of the elongated shaft, the blade member being flexible and supported by the elongated housing, such that the blade member oscillates relative to the elongated housing during rotation of the elongated cam member.

10. A surgical instrument for treating tissue, comprising:
    an elongated shaft having a proximal end portion, and a distal end portion configured to articulate relative to the proximal end portion;
    a drive shaft extending through the elongated shaft and configured to rotate about a longitudinal axis defined by the drive shaft, the drive shaft having a proximal end portion configured to be operably coupled to a drive motor; and
    an end effector assembly coupled to the distal end portion of the elongated shaft and including:
       a jaw member pivotable relative to the distal end portion of the elongated shaft; and
       a blade member opposing the jaw member, wherein the blade member is configured to operably engage a distal end portion of the drive shaft, such that the blade member is configured to oscillate in a direction perpendicular to the longitudinal axis in response to a rotation of the drive shaft to treat tissue disposed between the jaw member and the blade member,
    wherein the drive shaft has an elongated cam member supported on a distal end portion of the drive shaft and engaged with the blade member, the elongated cam member configured to rotate with the drive shaft and relative to the blade member.

11. The surgical instrument according to claim 10, wherein the end effector assembly includes an elongated housing extending distally from the distal end portion of the elongated shaft, the blade member being supported by the elongated housing and configured to oscillate relative to the elongated housing during rotation of the elongated cam member.

12. The surgical instrument according to claim 11, wherein the blade member is supported within a slot of the elongated housing and the blade member is configured to oscillate within the slot.

13. The surgical instrument according to claim 11, wherein the blade member is slidably supported within a cavity of the elongated housing.

\* \* \* \* \*